United States Patent
Mohan et al.

(10) Patent No.: US 7,313,809 B1
(45) Date of Patent: Dec. 25, 2007

(54) CONVERGENCE-ENABLED DVD AND WEB SYSTEM

(75) Inventors: Fergal John Mohan, Sunnyvale, CA (US); Rainer Brodersen, Santa Clara, CA (US)

(73) Assignee: Apple, Inc., Cupertino, CA (US)

( * ) Notice: Subject to any disclaimer, the term of this patent is extended or adjusted under 35 U.S.C. 154(b) by 0 days.

(21) Appl. No.: 09/546,575

(22) Filed: Apr. 10, 2000

Related U.S. Application Data

(60) Provisional application No. 60/129,724, filed on Apr. 16, 1999.

(51) Int. Cl.
*H04N 7/173* (2006.01)

(52) U.S. Cl. .................. 725/109; 725/110; 386/95; 386/125; 386/126

(58) Field of Classification Search .......... 386/45, 386/95, 125, 126, 46; 725/109–110
See application file for complete search history.

(56) References Cited

U.S. PATENT DOCUMENTS

| | | | | |
|---|---|---|---|---|
| 5,701,383 | A * | 12/1997 | Russo et al. ............. | 386/46 |
| 5,727,141 | A | 3/1998 | Hoddie et al. ............ | 395/175 |
| 5,774,664 | A | 6/1998 | Hidary et al. ........... | 395/200.48 |
| 5,774,666 | A * | 6/1998 | Portuesi ................. | 725/110 |
| 5,818,935 | A | 10/1998 | Maa ..................... | 380/20 |
| 5,909,551 | A * | 6/1999 | Tahara et al. ............ | 709/231 |
| 5,991,798 | A * | 11/1999 | Ozaki et al. ............. | 709/217 |
| 6,047,292 | A | 4/2000 | Kelly et al. | |
| 6,081,264 | A * | 6/2000 | Rosen et al. ............. | 345/723 |
| 6,173,406 | B1 * | 1/2001 | Wang et al. ............. | 713/201 |
| 6,230,295 | B1 * | 5/2001 | Watkins ................. | 714/742 |
| 6,262,724 | B1 * | 7/2001 | Crow et al. ............. | 345/723 |
| 6,434,326 | B1 * | 8/2002 | Kondo et al. ............ | 386/125 |
| 6,467,026 | B2 * | 10/2002 | Yamamoto et al. ........ | 711/118 |

(Continued)

FOREIGN PATENT DOCUMENTS

EP 0762422 A2 3/1997

(Continued)

OTHER PUBLICATIONS

RAC User's Manual RC5200P, 1996, Thomson Consumer Electronics.*

(Continued)

*Primary Examiner*—Vincent F. Boccio
(74) *Attorney, Agent, or Firm*—Pillsbury Winthrop Shaw Pittman LLP

(57) ABSTRACT

A system integrates a DVD system and a WWW web browser. Universal Resource Locator (URL) information corresponding to sites accessible by the browser are stored in fields within the DVD data. When a user actuates a DVD element that has a corresponding URL, the web browser displays information from that site. When the user actuates an HTML menu or other browser-implemented feature, the DVD system accesses a portion of the DVD data specified in the menu. This arrangement provides for two-way communication, i.e., HTML in the browser is able to control DVD content and vice-versa. Having the WWW information embedded in the DVD brings a number of benefits, the foremost of which is the ability to write a "one size fits all" template web page that can interrogate the DVD for URL information and present WWW content corresponding to the URL synchronized with the DVD information.

17 Claims, 2 Drawing Sheets

U.S. PATENT DOCUMENTS 6,564,255 B1 * 5/2003 Mobini et al. .............. 709/219
6,580,870 B1 * 6/2003 Kanazawa et al. ............ 386/95

FOREIGN PATENT DOCUMENTS

| EP | 0 814 419 A2 | 12/1997 |
| EP | 0814419 A2 | 12/1997 |
| EP | 0886276 A2 | 12/1998 |
| JP | 10063562 | 3/1998 |
| JP | 11161663 | 6/1999 |
| JP | 11161664 | 6/1999 |
| WO | WO 98/47080 | 10/1998 |

OTHER PUBLICATIONS

Mascha, M.; Seaman, G.; "Interactive education: Transitioning CD-ROMs to the Web," *Computer Networks and ISDN Systems*, NL, North Holland Publishing, Amsterdam, vol. 27, No. 2, Nov. 1, 1994, pp. 267-272.

Guidebook for DVD-Video Text Data Usage (Sep. 1999) V. 1.0.

* cited by examiner

CONVERGENCE-ENABLED DVD AND WEB SYSTEM

CROSS-REFERENCE TO RELATED APPLICATION

This application is based on and claims priority from U.S. Provisional Application Ser. No. 60/129,724, filed on Apr. 16, 1999 and hereby incorporated by reference.

BACKGROUND OF THE INVENTION

1. Field of the Invention

The present invention is directed to interactive multimedia systems. More particularly, the invention is directed to DVD systems which are able to selectively control the processing of content from the World Wide Web and the like, and to web-based systems which are able to selectively access DVD systems and the like.

2. Background of the Related Art

Digital Versatile Discs (or variously Digital Video Discs or DVDs) and the World Wide Web (WWW) are extremely powerful interactive multimedia tools. However, they both have their drawbacks. Although DVDs are capable of storing large amounts of high-quality video and audio data, once they are manufactured their content is essentially static; it cannot be changed, updated or personalized. Also, the limited interactivity does not meet the demands of many of today's computer-literate users. Further, although the WWW is dynamic and rapidly changing, it is not capable of providing high-quality multimedia content in real time for many users due to limited bandwidth.

SUMMARY OF THE INVENTION

The present invention has been made with the above problems of the prior art in mind, and a first object of the present invention is to provide a system for integrating static and interactive multimedia delivery systems such as DVD systems and the WWW.

It is another object of the present invention to provide a multimedia delivery system which is interactive and easily modifiable.

It is a further object of the present invention to provide a highly interactive and dynamic multimedia system which is capable of providing high-quality multimedia content.

The above objects are achieved according to an aspect of the present invention by providing a system which integrates a DVD system and WWW content or similarly presented information, such as HTML-formatted material. Universal Resource Locator (URL) information corresponding to sites or media streams accessible via the WWW or another content delivery system are stored in fields within the DVD data. When a user actuates a DVD element that has a corresponding URL the information from that site is displayed in a web browser to enhance the DVD viewing experience. Conversely, the DVD system can be controlled when the user actuates HTML information from a web page or the like. This arrangement provides for two-way control, i.e., HTML is able to control DVD content and vice-versa. Having the WWW information embedded in the DVD brings a number of benefits, perhaps the foremost of which is the ability to write a "one size fits all" template web page that can interrogate the DVD for URL information and present WWW content corresponding to the URL information and synchronized with the DVD content.

BRIEF DESCRIPTION OF THE DRAWINGS

These and other objects, features, and advantages of the present invention are better understood by reading the following detailed description of the preferred embodiment, taken in conjunction with the accompanying drawings, in which.

DETAILED DESCRIPTION OF THE PRESENTLY PREFERRED EXEMPLARY EMBODIMENT

Figure 1:
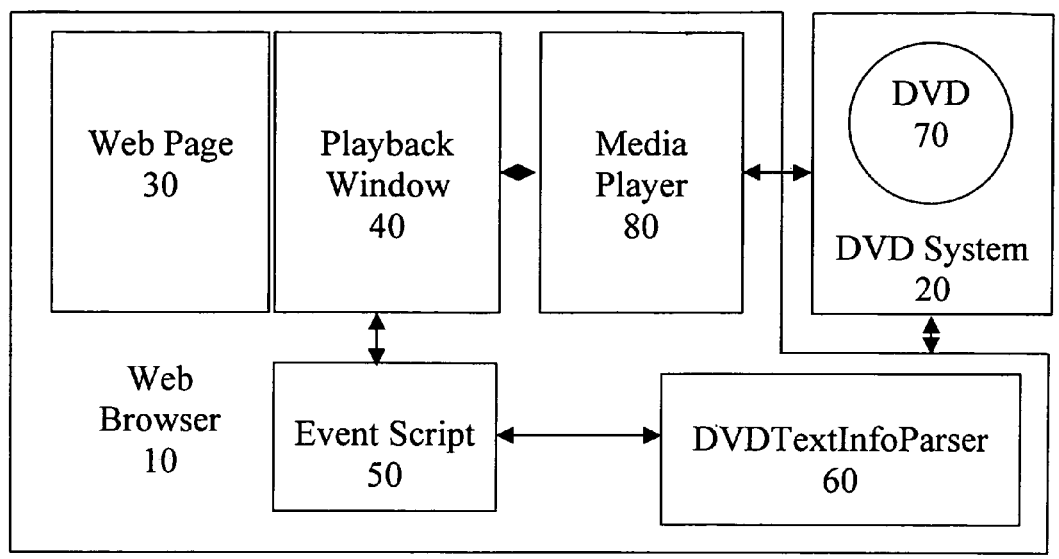
FIG. 1 is a block diagram of an integrated DVD and web browser system according to a preferred embodiment of the present invention.

FIG. 1 shows an integrated DVD/WWW system (preferably known as a "Convergence Enabled System") according to a preferred embodiment of the present invention. As is well known in the art, web browser 10 is preferably implemented on a personal computer or the like. The browser can preferably simultaneously display web content and DVD content or can be readily adapted to do so as will be apparent to those skilled in the art. Also, the DVD system 20 is preferably a DVD drive and associated support circuitry installed within the computer; however, a dedicated DVD player communicable with and controllable by the computer may also be used for this purpose. Further, DVD 70 played by the DVD system 20 is preferably specially authored as described in greater detail below.

Figure 2:
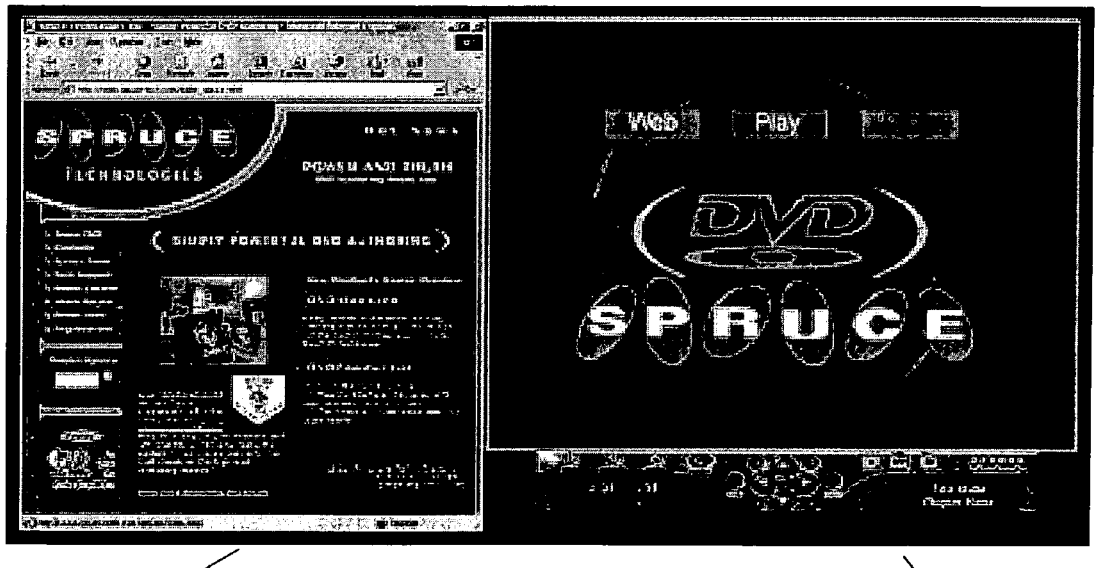
FIG. 2 is an example screen showing DVD and WWW playback according to the preferred embodiment.

In use, the browser 10 displays a web page 30 defined by, e.g., HTML code, and stored at a site specified by the user to the browser 10. The browser 10 may also display a separate or integrated playback field 40, i.e., a window, frame or other field) for video content from DVD system 20 or streamed content from the WWW, with synchronized audio from the DVD 20 or streamed content played on the computer's speakers as is known in the art (see FIG. 2). Preferably, the playback field 40 is generated by a media player 80, such as the Microsoft Windows Media Player, with a call thereto embedded in HTML code for the displayed web page as is known in the art. Other multimedia players may also be adapted for this purpose as well.

Figure 3:
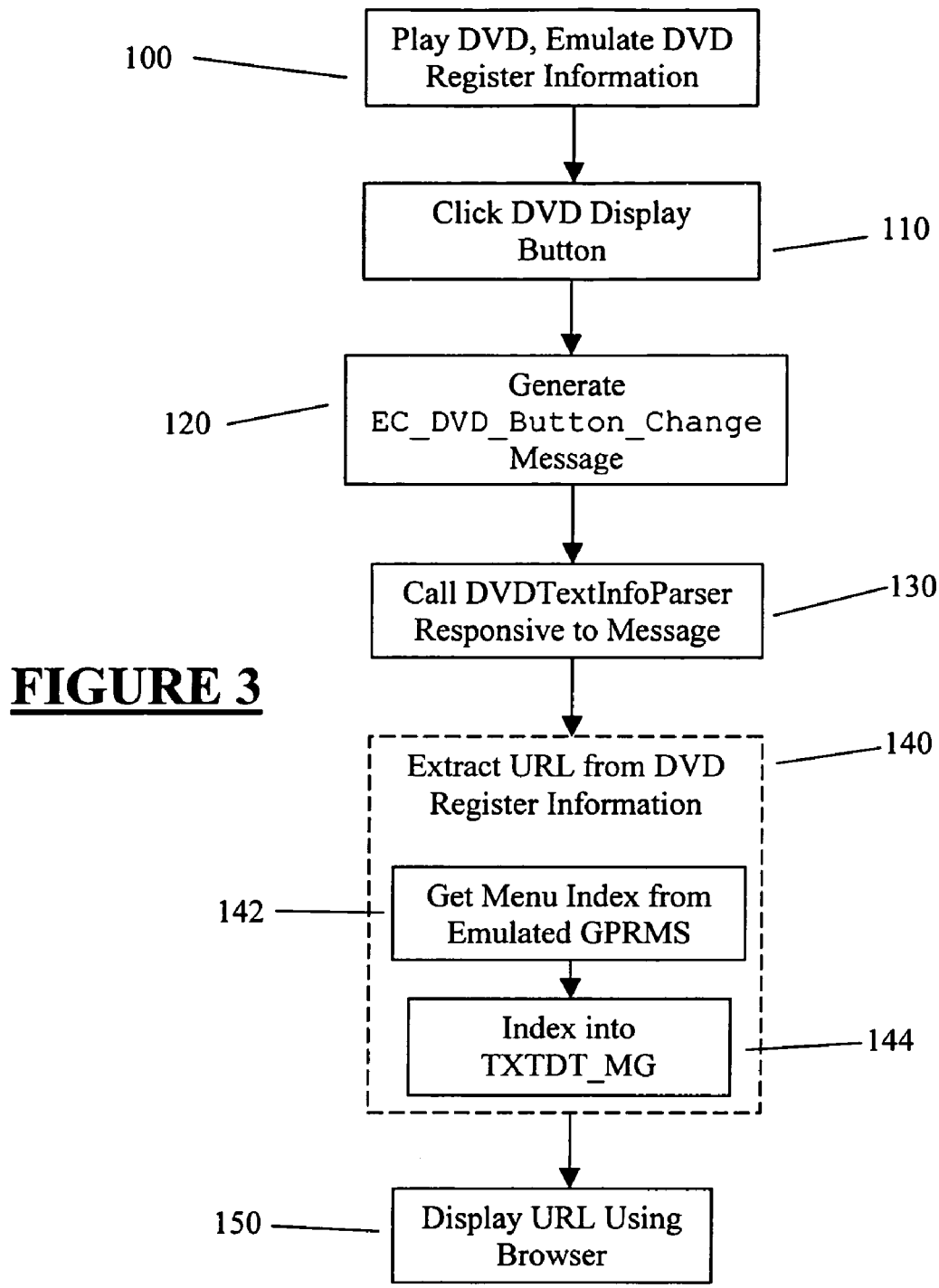
FIG. 3 is a flowchart showing the steps in displaying DVD content in conjunction with WWW or streamed media content in the preferred embodiment.

As is known in the art, DVD systems may be configured to display buttons and the like to enable a user to navigate the DVD 70 and access various portions thereof. In a dedicated DVD player, these buttons are accessed by a cursor controlled by cursor direction keys on the DVD player's console, remote control or the like; however, when a DVD is played in the computer using the media player 80, the buttons may be accessed by positioning or clicking the computer's mouse cursor on the buttons displayed by the media player 80 as is common with graphical user interfaces as shown in Step 110 of FIG. 3. When this occurs, the media player 80 generates a Windows event message such as EC_DVD_Button_Change signifying that a particular button has been selected or actuated and providing its number (Step 120). In the preferred embodiment, this message is intercepted by an event script 50 which calls DVDTextInfoParser 60 (Step 130), a custom object that uses the current DVD button (provided by the media player 80 via EC_DVD_Button_Change) and information extracted from a particular field within the DVD 70 corresponding to that button as described in greater detail below in order to obtain a URL (Step 140) that can be accessed by the web browser 10 and displayed on the web page 30 (Step 150).

More specifically, as is known in the art the media player 80 preferably generates information on the current status of the DVD 70 as part of its playback process. The DVD 70 is preferably authored to cause the DVD system 20 to write the index of the currently displayed menu into a specific General DVD parameter (GPRM) by, e.g., inserting DVD commands at strategic places into the DVD data set during its compilation. An example of a DVD authoring system which automatically performs this task is described in U.S. patent application Ser. No. 09/010,267 to Brodersen et al., incorporated herein by reference. A commercially available system which automatically performs this task is the DVD Maestro system of Spruce Technologies of San Jose, Calif.

In Step 100, the media player 80 will then emulate this register information (the GPRMs) when playing DVDs; for example, the method in which the windows media player does this is explained in Microsoft's documentation for the program. The menu index thus obtained from the GPRMs in Step 142 can be used in Step 144 as an index into corresponding fields in the DVD's TXTDT_MG structure, also read in by the media player 80, which contains URLs stored there by the DVD authoring system. As detailed in the DVD specification, the TXTDT_MG structure within the DVD data includes various predefined fields holding specified information such as producer name, vocalist name, languages and the like, and a provider-unique field designated for such use may be used to store the URL. Thus, by monitoring the designated GPRM, an outside program such as the event script 50 can reliably derive the appropriate URL from the current menu index and the current button.

For systems using Microsoft DirectShow, the DVDTextInfoParser object (based on an ATL COM interface named IDVDTextInfoParser) can preferably facilitate playback of DVD 70 using the DirectShow DVDGraphBuilder interface; however, other techniques also will be readily apparent to those skilled in the art. As described above, DVDTextInfoParser then accesses the DirectShow IDVDInfo interface to read in text data. This technique is used in the preferred embodiment; however, other techniques can be used with platforms on which DirectShow is not available; for example, the TXTDT_MG structure can be directly read in from the DVD 70.

Preferably, event script 50 is a Java script; however, alternative implementations such as a Microsoft Visual Basic Script may be used instead. Also, DVDTextInfoParser 60 is preferably an ActiveX control using an ATL COM interface; however, other program implementations may be used as well. Further, although DVDTextInfoParser 60 may access the DVD system 20 each time a URL is needed, in the preferred embodiment it preferably reads the TXTDT_MG structure into memory each time a DVD 70 is initialized, and references the information in memory. This is because the Windows Media Player used as the media player 80 in the preferred embodiment does not work well with other objects simultaneously accessing interfaces to the same DVD 70. If this problem is resolved in future versions of DirectShow, the access-as-needed scheme might work equally well.

Thus, a "one size fits all" template web page could be made in which a field 40 displays DVD playback while a window 30 displays web content. When the user selects a button, the media player 80 generates an EC_Button_Change event which is acted upon by the event script 50 to call DVDTextInfoParser 60 based on the button number and menu title index number to obtain the corresponding URL from the DVD's TXTDT_MG structure. The content corresponding to the retrieved URL is then displayed in the web page 30. Similarly, when an EC_Domain_Change or EC_Chapter_Change event occurs, DVDTextInfoParser 60 could be called to check for corresponding URLs and synchronize the web content in web page 30 to the current chapter displayed in playback field 40. If the corresponding URL content contains a reference to streaming content, the streaming video can be displayed in combination with or in place of the DVD content.

In a similar manner, HTML code in the web page 30 may make calls to the event script 50 or a similar script to retrieve the URLs stored in TXTDT_MG as will be readily apparent to those skilled in the art. These may then be displayed in the web page 30 as hyperlinks, controls or the like to enable the browser to display web content 30 corresponding to URLS in the DVD 70. Thus, rather than or in conjunction with controlling the system by accessing features of the DVD display 40 as described above, the system may be controlled by accessing features of the web page 30.

The above description of the preferred embodiment has been presented for explanation purposes only, and the present invention is not so limited. Modifications, embellishments and alternative implementations of the invention will be readily apparent those skilled in the art and are encompassed by the invention.

For example, in the preferred embodiment the URLs associated with the DVD menu buttons have been references to web pages or streaming video; however, the URLs may point to other types of resources and rely on the system to call appropriate helper applications; for example, a URL might point to a file in Adobe Acrobat PDF format, so that when the browser accesses it the Adobe Acrobat reader will automatically be called to display it. Even further, the URLs need not point to data files, but can also refer to programs which will be played when the corresponding buttons are actuated or the like.

Further, numerous practical applications of the invention will become apparent to those skilled in the art. For example, information on events and webcasts could be distributed in the form of an electronic magazine. Consumers would receive the electronic magazine in the mail on DVD. The DVD can combine rich video content of the various artists and events, high quality samples of content (webcasts, etc.) to be purchased, interviews, concert information and the ability to purchase associated merchandise all on one disc. Since the disc uses high quality graphical elements that are assembled from an HTML template stored on a separate server, the viewer's experience can change as often as the DVD distributor wishes. In fact, different content may be served to different consumers based on parameters in the URLs. The fact that one disc can be a totally different experience for everyone that views it makes the system a highly flexible and effective advertising medium.

In another potential application, a DVD containing a business or sales training program produced to take advantage of many DVD features, such as Multiple Language Tracks and Multiple Camera Angles, could be distributed worldwide. Viewers could interact directly with the content and be qualified based on their performance. The DVDs would be usable at any time as an offline reference.

In yet another potential application, a professor works with his AV team to author several DVDs to be distributed to the students to take with them. The student may then view lectures and seminars from top professors from around the world in their own home. Classwork and tests could be administered remotely via each professor's website. Scheduled class hours with chat boards would give the student the ability to refer to every discussion that ever took place at any given time, and the DVDs could be saved as future references.

Such variations and implementations are to be considered within the scope of the present invention.

What is claimed is:

1. A system for generating information representative of the contents of a DVD, the DVD having been authored such that the information includes embedded commands to populate one or more General DVD Parameter Registers (GPRMs), the system comprising:
   a DVD unit for playing the DVD and generating information representative of the contents of a DVD and, upon receiving a certain command embedded in the information, writing indicia of a current position of play within the DVD into the one or more GPRMs;
   a media unit adapted to receive the information and extract a TXTDT_MG data structure associated with the DVD, and further adapted to display video content extracted from the information; and
   a browser for displaying content designated by Universal Resource Locators (URLs), the URLs being derived by using the GPRMs to index into the TXTDT_MG data structure.

2. The system of claim 1, wherein URLs are derived using a DVD Text Data parser and the indicia to index into the DVD Text Data Structure to obtain the URL.

3. The system of claim 2, wherein:
   the media player is for displaying a menu button specified by the information from the DVD, the menu button being associated with the URL, the association between the menu button and the URL being responsive to the positional playback data in the GPRMs; and
   the browser is for displaying the content specified by the URL responsive to user actuation of the menu button.

4. The system of claim 3, wherein
   the media player is for generating a button number message responsive to the user actuation of the menu button, the system further comprising an event script for receiving the message and responsive thereto calling the DVD Text Data parser.

5. The system of claim 3, wherein:
   the DVD Text Data parser is further for receiving a DVD Text Data Structure from the DVD each time the DVD is initialized, the DVD Text Data Structure including the URLs; and
   the DVD Text Data parser is for using the button number message to index into the DVD Text Data Structure to obtain the URLs.

6. The system of claim 1, wherein the content designated by the URL is HTML-coded.

7. The system of claim 1, wherein the content designated by the URL is streaming media content.

8. A system for generating information representative of the contents of a DVD, the DVD having been authored such that the information includes embedded commands to populate a plurality of elements of a General DVD Parameter Register (GPRM) with positional playback data, the system comprising:
   a DVD unit for playing the DVD and generating the information and, upon receiving a certain embedded command, writing indicia of a current position of play within the DVD into the GPRM;
   a DVD Text Data parser for receiving the information and parsing a TXTDT_MG data structure in the information to derive data containing a Universal Resource Locator (URL) therefrom;
   a browser for displaying a hyperlink corresponding to the URL and, responsive to actuation thereof, content designated by the URL; and
   a media player adapted for receiving the information, extracting video content from the information, and displaying the video content.

9. The system of claim 8, wherein the content designated by the URL is HTML-coded.

10. The system of claim 8, wherein the content specified by the URL is streaming media content.

11. A system for generating information representative of the contents of a DVD, the DVD having been authored such that the information includes embedded commands to populate a plurality of elements of a General DVD Parameter Registers (GPRM) with positional playback data, the system comprising:
    a DVD unit for playing the DVD and generating the information and, upon receiving a certain embedded command, writing indicia of a current position of play within the DVD into the GPRM;
    a DVD Text Data parser for parsing a DVD Text Data Structure based on content of the GPRM to derive a Universal Resource Locators (URL) therefrom;
    a browser for displaying a hyperlink corresponding to the URL and, responsive to actuation thereof, for displaying content designated by the URL; and
    a media player adapted for receiving the information, extracting the DVD Text Data Structure from the information, extracting video content from the information, and displaying the video content, the video content including a button associated with the URL;
    wherein the browser is further for displaying content designated by the URL responsive to an actuation of the button.

12. The system of claim 11, wherein the information from the DVD includes positional information associated with the URL.

13. The system of claim 12, wherein the positional information indicates a position of the button within the DVD content.

14. A system for generating information representative of the contents of a DVD, the DVD having been authored such that the information includes embedded commands to populate a plurality of elements of a General DVD Parameter Registers (GPRM) associated with the DVD with positional playback data, the system comprising:
    a DVD unit for playing the DVD and generating the information and, upon receiving a certain embedded command, writing indicia of a current position of play within the DVD into the GPRM;
    a DVD Text Data parser for deriving a data structure from the information and, based on the content of the GPRM, parsing the information to derive a plurality of URLs therefrom; a browser for displaying content designated by any one of the plurality of URLs, wherein the browser displays content upon actuation of the any one URL; and
    a media player adapted for receiving the information, extracting video content from the information, and displaying the video content, the media player being further adapted to display a plurality of buttons, wherein each button is associated with at least one of the plurality of URLs, the association between the each button and the at least one URL being responsive to the positional playback data in the GPRM.

15. The system of claim 14, wherein:
    the information includes a DVD Text Data Structure; and the DVD Text Data parser uses the positional playback data to index into the DVD Text Data Structure to obtain a selected URL from the plurality of URLs.

16. The system of claim 14, wherein the browser displays the designated content designated at the same time as the media player displays video content.

17. The system of claim 14, wherein the browser is further for displaying a hyperlink corresponding to the any one URL.

* * * * *